(12) United States Patent
Simske et al.

(10) Patent No.: US 8,376,235 B2
(45) Date of Patent: Feb. 19, 2013

(54) BLUR RESISTANT BARCODE

(75) Inventors: Steven J. Simske, Fort Collins, CO (US); Matthew D. Gaubatz, Ithaca, NY (US); Robert Alan Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/494,725

(22) Filed: Jun. 12, 2012

(65) Prior Publication Data

US 2012/0248193 A1 Oct. 4, 2012

Related U.S. Application Data

(62) Division of application No. 12/567,392, filed on Sep. 25, 2009, now Pat. No. 8,226,010.

(51) Int. Cl.
*G06K 7/10* (2006.01)

(52) U.S. Cl. ............................ 235/462.32; 235/462.01

(58) Field of Classification Search ............... 235/462.1, 235/462.08, 462.32, 462.49, 494
See application file for complete search history.

(56) References Cited

U.S. PATENT DOCUMENTS

| | | | | |
|---|---|---|---|---|
| 5,189,292 A * | 2/1993 | Batterman et al. | ............ | 235/494 |
| 6,565,003 B1 * | 5/2003 | Ma | .............................. | 235/462.1 |
| 6,672,511 B1 * | 1/2004 | Shellhammer | ........... | 235/462.08 |
| 2004/0256465 A1 * | 12/2004 | Longacre, Jr. | ........... | 235/462.49 |
| 2009/0277962 A1 * | 11/2009 | McCloskey | .............. | 235/462.01 |

\* cited by examiner

*Primary Examiner* — Thien T Mai
(74) *Attorney, Agent, or Firm* — Steven L. Webb

(57) ABSTRACT

A blur resistant barcode is disclosed. The blur resistant barcode comprise a plurality of parallel lines and spaces where information is encoded in the barcode by variations in the thicknesses of the plurality of parallel lines and by variations in the spacing between the plurality of parallel lines. The blur resistant barcode has at least one blur resistant feature that has a thickness in an axis of motion greater than a maximum thickness of any one of the plurality of parallel lines. The axis of motion is perpendicular to the plurality of parallel lines.

6 Claims, 4 Drawing Sheets

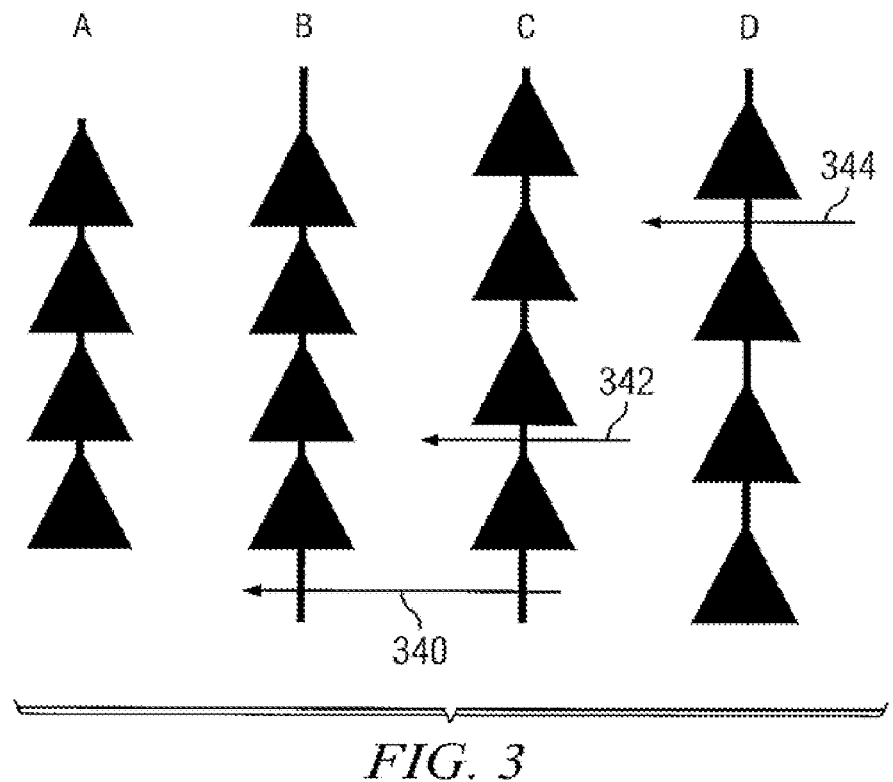
*FIG. 3*
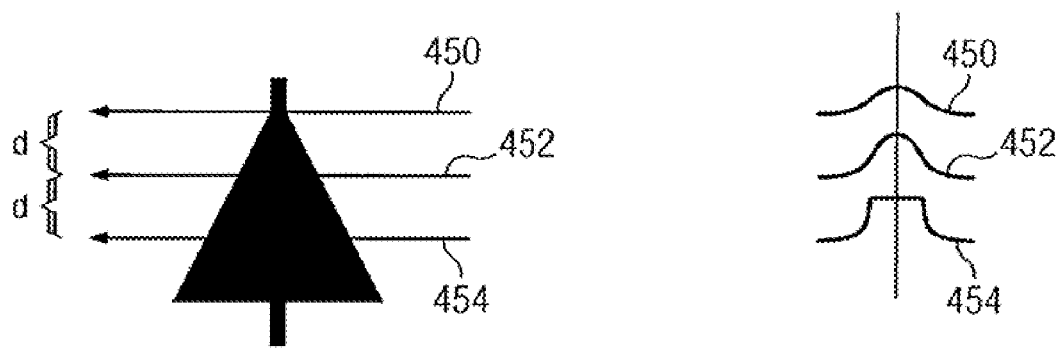
*FIG. 4a*  *FIG. 4b*

BLUR RESISTANT BARCODE

This application is a divisional of, and claims priority too, prior application Ser. No. 12/567,392, filed Sep. 25, 2009 now U.S. Pat. No. 8,226,010, titled "Blur resistant barcode", which is hereby incorporated by reference.

BACKGROUND

Barcodes have been in use since 1974. Barcodes are machine readable representations of data. In a basic one-dimensional barcode, the data is typically encoded by the thicknesses of parallel lines and the distance or thicknesses of the spaces between the parallel lines. Some barcodes have additional, or secondary, information encoded into the lines. The mapping between messages and barcodes is called a symbology. The specification of a symbology includes the encoding of the single digits/characters of the message as well as the start and stop markers into bars and space, the size of the quiet zone required to be before and after the barcode, as well as the computation of a checksum.

The symbology also includes a definition for the thicknesses of the parallel lines and spaces in a barcode. There are two main types of linear symbologies: two-width symbologies and many-width symbologies. Bars and spaces in two-width symbologies are wide or narrow. How wide a wide bar is exactly has no significance as long as the symbology requirements for wide bars are adhered to, usually two to three times wider than a narrow bar. Bars and spaces in many-width symbologies are all multiples of a basic width called the module. Most many-width symbologies use four widths of 1, 2, 3 and 4 modules.

One use for barcodes is to electronically identify items during checkout. Barcodes may also be used during the manufacturing process. When used in a manufacturing process, the barcode may be in motion when scanned. On a high speed manufacturing line, or a high speed printing press, the speed of the barcode with respect to the barcode reader may cause the image of the barcode being scanned to be blurred in the direction of motion. When the blurring or smearing becomes too pronounced, the barcode may become unreadable.

One way to reduce the blurring of the barcode image is to slow down the relative motion between the barcode and the barcode reader. Another method to reduce the bluffing of the barcode image is to increase the illumination so that the exposure time used to capture the image of the barcode is shortened. Some methods use image processing to remove the blur from the barcode image. One example of image processing to remove blur is a de-convolution using a Wiener Filter. De-convolution to remove blur typically requires a measure of the blur radius.

FIG. 1a is a bar from a barcode. FIGS. 1b-1d are inverse plots of intensity from the image of the bar in FIG. 1a formed at different scanning speeds. The image in FIG. 1b was scanned relatively slowly. The image in FIG. 1b has some blurring along each edge of the bar. The intensity I reaches a minimum in the middle of the bar as shown by the flat top. The blur radius 13 can be calculated from the image in FIG. 1b. Using the blur radius, image processing can be used to remove the blur from the image thereby enabling the measurement of the thickness of the bar. Once the thickness of the bars and spaces are measured, the barcode can be decoded.

The image in FIG. 1c was scanned at a faster speed. The image in FIG. 1c has significantly more blurring along each edge of the bar. The intensity I may reach a minimum in the middle of the bar, but it's difficult to confirm. The blur radius B might be able to be calculated from the image in FIG. 1c. The image in FIG. 1d was scanned at the fastest speed. The image in FIG. 1d has blurring along the entire image of the bar. The intensity does not reach the minimum intensity I in the middle of the bar. A blur radius B can not be calculated from the image in FIG. 1d. Therefore the barcode can not be decoded with this level of blurring. In general, when the blur radius is greater than ½ the bar thickness, the blur radius can not be calculated from the blurred image and the barcode can not be read. The blur radius sets the speed limit a barcode can be scanned for a given exposure time. The spacing between bars in a barcode also affects the maximum speed a barcode can be scanned.

BRIEF DESCRIPTION OF THE DRAWINGS

FIG. 3 is a diagram showing triangles added to thin bars in a barcode in an example embodiment of the invention.

FIG. 4A is a drawing of a triangle scanned at three different locations in an example embodiment of the invention. FIG. 4B is a plot of a triangle scanned at different locations.

DETAILED DESCRIPTION

FIGS. 1-8, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

When a barcode is scanned while in motion, the image of the barcode may become blurred. The blur amount can be quantized as a blur radius. In one example embodiment of the invention, a barcode is modified such that the blur radius can be calculated even when the blur radius is greater than ½ the maximum bar thickness allowed by the barcode symbology or ½ the maximum spacing between the bars allowed in the barcode symbology. In one example embodiment of the invention, the modification to the barcode is the addition of a mark or fiduciary nearby a standard barcode.

Figure 1A:
FIG. 1a is a bar from a barcode.
Figure 1B:
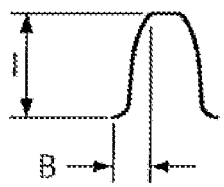
FIG. 1b-1d are inverse plots of intensity from the image of the bar in FIG. 1a formed at different scanning speeds.
Figure 1C:
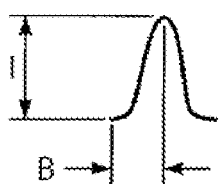
Figure 1D:
Figure 2:
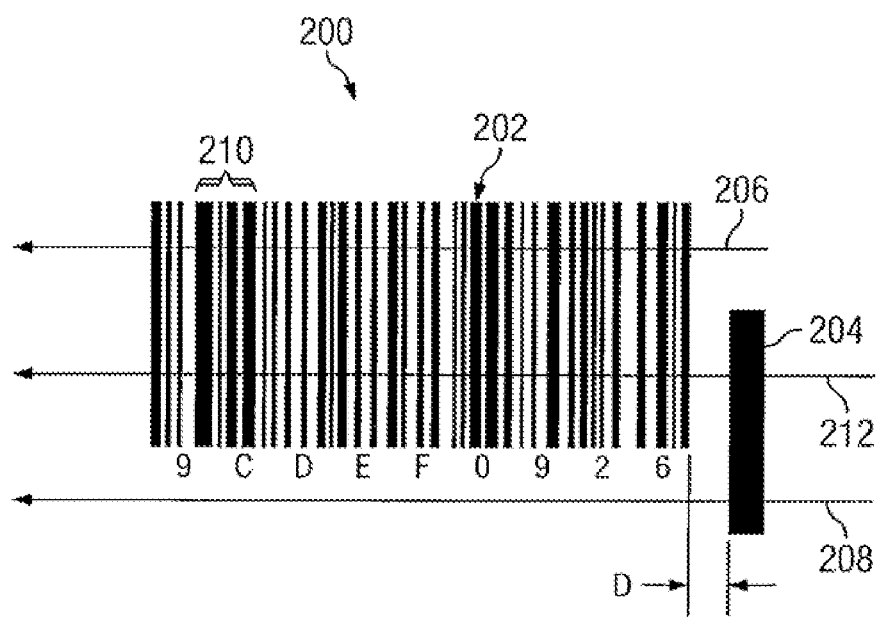
FIG. 2 is an augmented barcode 200 in an example embodiment of the invention.

FIG. 2 is an augmented barcode 200 in an example embodiment of the invention. Augmented barcode 200 comprises a standard barcode 202 and mark 204. Standard barcode 202 may be a barcode created using any standard barcode format or symbology, for example Code 39, Code 93, EAN/UCC 128, or the like. Mark 204 may be a bar having a width or thickness that is greater than the maximum thickness for any of the bars or spaces in the standard barcode 202. The maximum thickness of a bar in a barcode is set by the symbology of the barcode. Therefore the minimum thickness of Mark 204 is also controlled by the symbology used to create standard barcode 202. Mark 204 may be located at either end of standard barcode 202. In one example embodiment of the invention, Mark 204 may extend below standard barcode 202.

Augmented barcode 200 is typically scanned in the direction shown by arrows 206, 208 and 212 (the barcode will be moving in the opposite direction with respect to the scanner). When the blur radius is expected to be less than one-half the maximum bar thickness or one-half the maximum spacing between bars, augmented barcode 200 may be scanned and decoded using only the standard barcode 202. In this case, scan line 206 may be used. When the blur radius is greater than one-half the maximum bar thickness, scan line 208 and/or 212 may be used. When using scan line 208 or 212 the blur radius can be determined using mark 204.

The width or thickness of mark 204 is greater than the maximum thickness allowed for any of the bars or spaces in the standard barcode 202. In some cases the thickness of mark 204 may be greater than 4 times the maximum bar thickness in the standard barcode 202. The thickness of mark 204 is chosen such that a smooth transition from the full black oldie bar to the full white of the background is obtained when mark 204 is scanned. Using the smooth transition from minimum intensity to maximum intensity, the blur radius can be determined. Once the blur radius has been determined, the blur can be removed from the image of the standard barcode and the barcode can be decoded.

Mark 204 is placed distance D away from standard barcode 202 along the scanning axis. In one example embodiment of the invention, distance D is greater than or equal to the thickness of mark 204. When distance D is greater than 2 times the blur radius, scanning line 212 may be used to both determine the blur radius and capture an image of the standard barcode. When distance D is smaller than 2 times the blur radius, scanning line 208 may be used to determine the blur radius, and scan line 206 may be used to capture the image of standard barcode 202. In some embodiments, even when distance D is greater than 2 times the blur radius, scan line 208 may be used to determine the blur radius. Using scan line 208 to determine the blur radius prevents misidentifying large dark areas in standard barcode 202, area 210 for example, as mark 204.

In another example embodiment of the invention, the modification to the barcode that allows the determination of the blur radius is the addition of features to the bars of a barcode. In this embodiment the additional features added to the bars of the barcode are triangles. FIG. 3 is a diagram showing triangles added to thin bars in a barcode in an example embodiment of the invention. In FIG. 3, four isosceles triangles have been added to each bar. This invention is not limited to adding four triangles to each bar. Any number of triangles may be added to a bar. The triangles in bar A are evenly spaced and are sized such that the triangles span the entire bar. The triangles in bars B, C and D are sized such that they do not fill the entire bar. The triangles on bar B are touching each other and are positioned in the middle of the bar, leaving uncovered a section of the bar at the top and bottom. The triangles in bars C and D have gaps between the triangles. The triangle in bar C are moved towards the top of the bar, and the triangles in bar D are moved towards the bottom of the bar. Other arrangements for the placement of the triangles on the bars may be used.

When the blur radius is less than ½ the thickness of bars B, C or D, the thickness of the bars can be determined normally using scan lines 340, 342, and 344. When the blur radius is greater that ½ the thickness of bars B, C or D, the triangles may be used to determine the blur radius. The blur radius can be calculated from the image of the triangles clue to the linear variation in spacing along the edge of the triangles.

FIG. 4 is a drawing of a triangle scanned at three different locations in an example embodiment of the invention. In FIG. 4a the triangle is shown with three different scan lines (450, 452, and 454) spaced along the triangle. FIG. 4b is an inverse intensity plot of the three scan lines at a given scanning speed. Scan line 450 is at the top of the triangle, scan line 452 is near the middle of the triangle, and scan line 454 is near the bottom of the triangle. The inverse intensity plot for scan line 450 is blurred along the entire image. The inverse intensity plot for scan line 452 may reach the minimum intensity with significant blur along both edges of the image. The inverse intensity plot for scan line 454 reaches the minimum intensity, shown by the flat top of the intensity plot, but still has blur along both edges of the image. Using the intensity plots of the different scan lines and the known distance between scan lines, the blur radius can be determined.

In one example embodiment of the invention, each barcode is scanned with multiple scan lines spaced apart by a known distance, for example distance d. The information from the multiple scan lines and the distance between scan lines is used to determine the blur radius. Once the blur radius has been determined, the barcode can be decoded. In another example embodiment, the placement of the triangles onto the bars of the barcode is varied in a known order between different placement types, for example placement types A, B, C and D. With the placement of the triangles varying between the different bars of the barcode, a single scan line will intersect the triangle at different locations along the height of the different triangles. Using the information from the single scan line, the blur radius is determined and then the barcode is decoded. In another example embodiment, a two-dimensional (2-D) image of the entire barcode is captured using a charged coupled device (CCD). A single row of pixels or multiple rows of pixels in the 2-D image may be used to determine the blur radius and to decode the information within the barcode. In this application, a scan line is defined to include an image generated by sweeping a single point of light across a barcode or as an image from a single row of pixels in a 2-D array of pixels that were used to capture the image of the barcode.

When using four triangles, the triangle can be used to add four additional bits of information to each bar in a barcode. The presence of a triangle in the top position can indicate a 1000 and the absence of it triangle in the top position can indicate a 0000. The presence of a triangle in the second to the top position can indicate a 0100. The presence of a triangle in the second to the bottom position can indicate a 0010, and the presence of a triangle in bottom position can indicate a 0001. Even when the blur is so great that the blur radius can not be determined using the triangles, the additional information encoded with the triangles may be decoded. In one example embodiment of the invention, the information encoded by the triangles may replicate the information encoded in the bars of the barcode. In other example embodiments of the invention, the information encoded by the triangles may contain additional information not encoded by the bars in the barcode.

Figure 5:
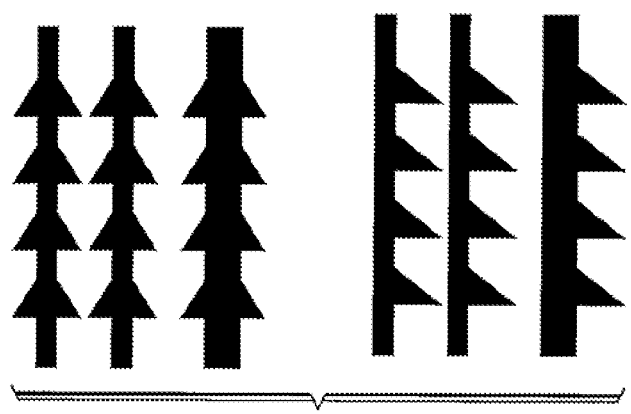
FIG. 5 is a drawing of triangles added to thick bars from a barcode in an example embodiment of the invention.
Figure 6:
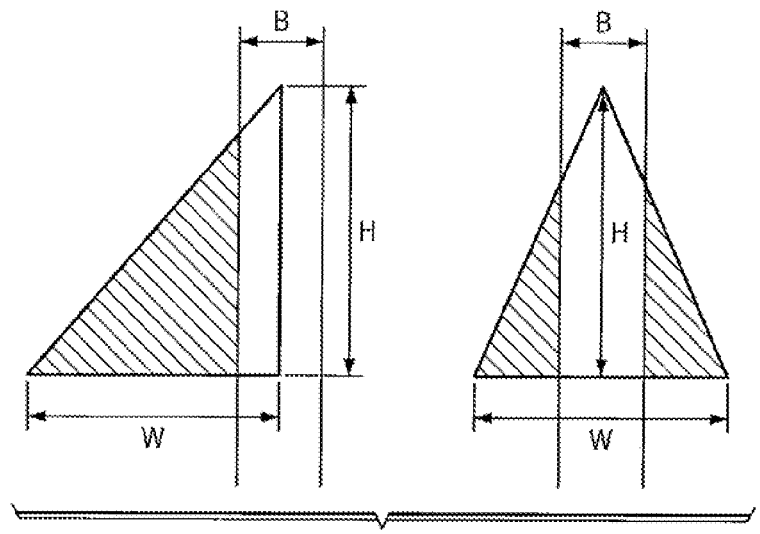
FIG. 6 is a drawing of a right triangle and an isosceles triangle added to a bar in an example embodiment of the invention.

The thicknesses of the bars in a barcode vary depending on the information encoded into a barcode, as well as the barcode symbology. FIG. 5 is a drawing of triangles added to thick bars from a barcode in an example embodiment of the invention. FIG. 5 also shows that the type of triangle added to a barcode may vary. The three bars on the left side of FIG. 5 show isosceles triangles added to the bars. The three bars on the right side of FIG. 6 show right triangles added to the bars.

The visible area of a triangle attached to a barcode varies dependent on the type of triangle used. FIG. 6 is a drawing of a right triangle and an isosceles triangle added to a bar in an example embodiment of the invention. Each triangle has the same height H and width W, and thus the same area. The width W is determined by the spacing between the bars in the barcode. Each bar in a barcode has a non-zero thickness B. Because the bars in a barcode overlay different proportions of the different types of triangles, there is a difference in the amount of visible area of the triangles that can be used to recover blur information. The visible area of the right triangle is given by $Ar=(H/2W)(W-b/2)^2$. The visible area of the isosceles triangle is given by $Ai=(H/2W)(W-B)^2$. For non-zero bar thickness the right triangle will always have more visible area than the isosceles triangle. In some example embodiments of the invention, the size of the triangles added to the barcode are so large that the spacing between the bars may be increased. A simple transformation may be used to increase the spacing between the bars, for example the space between the bars may be increase by a factor of 2.

Figure 7:
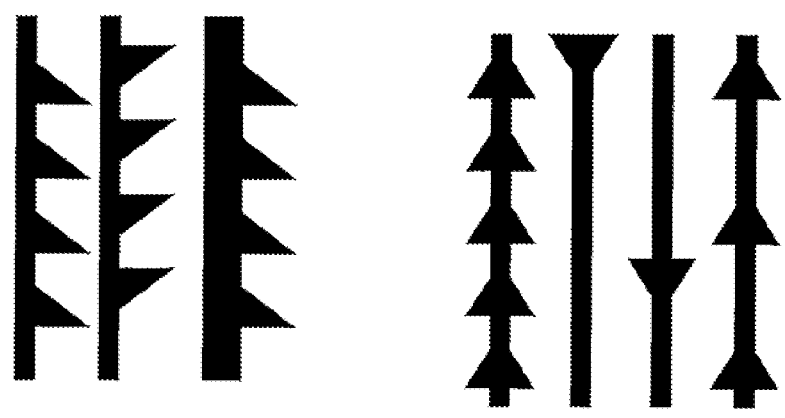
FIG. 7 is a drawing of triangles added to bars with the orientation of the triangles varying on the different bars in an example embodiment of the invention.

The orientation of the triangles on a bar is another degree of freedom. FIG. 7 is a drawing of triangles added to bars with the orientation of the triangles varying on the different bars in an example embodiment of the invention. The three bars on the left side of FIG. 7 show the orientation of the triangles switching every other bar. By switching the orientation of the triangles on every other bar, the blurring clue to triangles on adjacent bars may be reduced.

The per-bar symbol polarity can be strategically inverted (reverse polarity) in order to further minimize inter-triangle blurring. When the triangles on a bar represent the symbol 0111, the "reverse polarity" version of this symbol is 1000. The reverse polarity version of the symbol can be combined with a switch in orientation of the triangles on the bar. The four bars on the right side of FIG. 7 show a combination of triangle orientation switching and reverse polarity switching. The symbols represented by each bar (from left to right) are 11111, 011111, 11101, and 010101. The first and the fourth bar have normal polarity with the apex of the triangles pointing upward. The middle two bars use reverse polarity with the apex of the triangles pointing down.

Some barcode formats or symbologies, for example UPC-A, optically invert half the symbols in the barcode. The result of the optical inversion is that the spaces are turned black and the bars are turned white. This effectively makes thin bars thick and thick bars thin. Barcode with triangles added to the bars can be used for formats that require optical inversion.

Figure 8A:
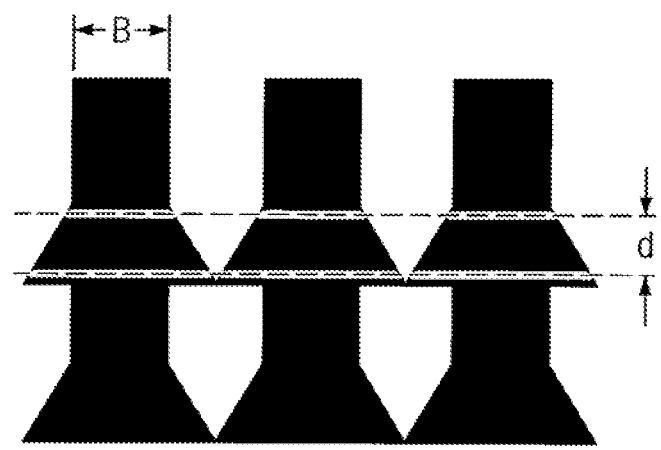
FIG. 8A is a drawing of bars in a barcode with triangles added to the bars in an example embodiment of the invention.
Figure 8B:
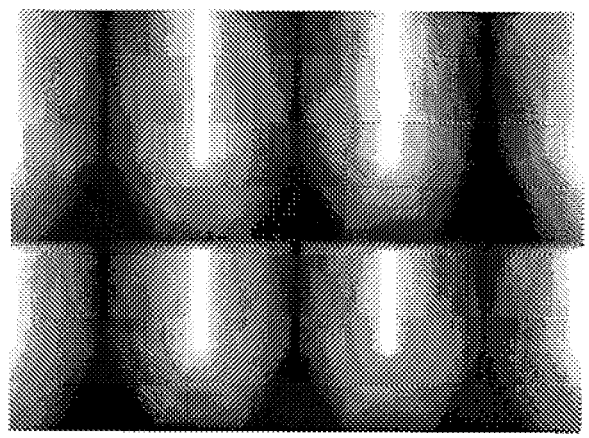
FIG. 8B shows an image of the bars from FIG. 8A when imaged with a linear blur radius of ½ the bar thickness B.
Figure 8C:
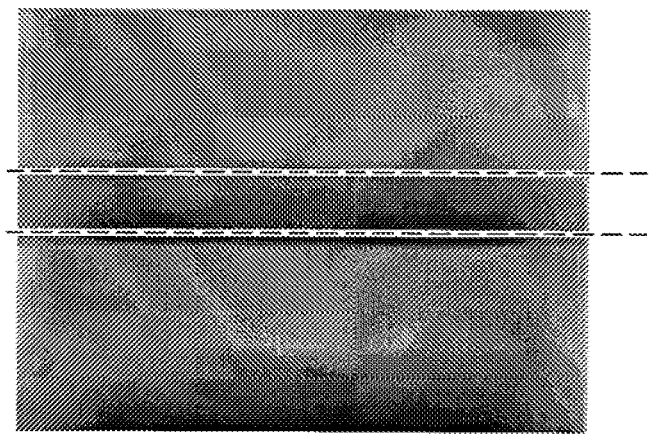
FIG. 8C shows an image of the bars from FIG. 8A when imaged with a linear blur radius of the bar thickness B.

In one example embodiment of the invention, the blur radius may be determined using only partial information about the barcode and the triangles. Full information includes all of the following information: the width of the black bats (un-blurred) in a barcode, the width of the base of the triangle (un-blurred), the angle of the triangle, and the distance between scan lines in the barcode reader. FIG. 8A is a drawing of bars in a barcode with triangles added to the bars in an example embodiment of the invention. Each bar has a width B. The bars are also spaced apart by distance B. The base of the triangles has a width of 2B. Two scan lines, separated by a distance d, are shown passing through one set of the triangles. FIG. 8B shows an image of the bars from FIG. 8A when imaged with a linear blur radius of ½ the bar thickness B. FIG. 8C shows an image of the bars from FIG. 8A when imaged with a linear blur radius of the bar thickness 13.

In FIG. 8C all scan lines will produce a flat uniform response except at each end of the barcode. The magnitude of the flat response varies dependent on if the scan line passes through some part of the triangles. Let's assume the width of the un-blurred barcode 13 is unknown and the angle of the triangles is unknown. We still know that the triangles fan out at a constant linear rate. Therefore the value (magnitude) of the blurred signal is directly proportional to the distance away from the base of the triangle. Using the signal from two scans that pass through a set of triangles at two different points, the width of the bars B can be determined, and then the blur radius can be determined.

What is claimed is:

1. A method for reading and decoding a motion blur resistant barcode when the motion blur resistant barcode is in relative motion with respect to a scanning device along an axis of motion, comprising:

capturing an image from at least one scan line along the axis of motion of the motion blur resistant barcode with the scanning device, wherein the barcode comprises a plurality of parallel lines and spaces where information is encoded in the barcode by variations in a thickness of the plurality of parallel lines and by variations in the spacing between the plurality of parallel lines;

extracting a blur radius from at least one motion blur resistant feature in the image wherein the blur radius is a measure of the blur due to the relative motion between the motion blur resistant barcode and the scanning device, wherein the at least one motion blur resistant feature comprises triangles added to at least one bar in the barcode;

removing the blur from the image using the blur radius;

decoding the motion blur resistant barcode from the non-blurred image.

2. The method for reading and decoding a motion blur resistant barcode of claim 1, wherein the position of the triangles on the motion blur resistant barcode in an axis perpendicular to the axis of motion is used to encode information.

3. The method for reading and decoding a motion blur resistant barcode of claim 1 further comprising:

capturing an image from at least two scan lines with the scanning device wherein each scan line is along the axis of motion of the motion blur resistant barcode and the at least two scan lines are separated by a distance d and wherein the distance d is less than a height h of the at least one triangle.

4. The method for reading and decoding a motion blur resistant barcode of claim 1, wherein at least one triangle on a first one of a plurality of parallel lines is oriented in a first direction and at least one triangle on a second one of the plurality of parallel lines is oriented in a second direction where the first direction is different than the second direction.

5. The method for reading and decoding a motion blur resistant barcode of claim 4, wherein the at least one triangle on the second one of a plurality of parallel lines is encoding information in a reverse polarity format.

6. The method for reading and decoding a motion blur resistant barcode of claim 1, wherein the presence or absence of a triangle at a location on the barcode in an axis perpendicular to the axis of motion encodes additional information.

* * * * *